United States Patent
Batta et al.

(10) Patent No.: US 11,536,218 B1
(45) Date of Patent: Dec. 27, 2022

(54) METHOD AND SYSTEM FOR A CYLINDER LINER

(71) Applicant: Caterpillar Inc., Peoria, IL (US)

(72) Inventors: Christopher L. Batta, West Lafayette, IN (US); Aaron S. Ness, Battle Ground, IN (US); Zachary T. Jacobs, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/501,898

(22) Filed: Oct. 14, 2021

(51) Int. Cl.
*F02F 1/00* (2006.01)
*B24B 33/02* (2006.01)
*F16J 10/04* (2006.01)

(52) U.S. Cl.
CPC .............. *F02F 1/004* (2013.01); *B24B 33/02* (2013.01); *F16J 10/04* (2013.01); *F02F 2200/00* (2013.01)

(58) Field of Classification Search
CPC ...... F02F 1/004; F02F 1/16; F02F 1/20; F02F 2200/00; F16J 10/04; B24B 33/02
See application file for complete search history.

(56) References Cited

U.S. PATENT DOCUMENTS

| | | | | |
|---|---|---|---|---|
| 4,617,070 A | * | 10/1986 | Amende | C21D 1/09 148/903 |
| 5,630,953 A | * | 5/1997 | Klink | B23K 26/364 219/121.69 |
| 5,701,861 A | * | 12/1997 | Hegemier | F02F 1/20 123/193.2 |
| 6,220,214 B1 | | 4/2001 | Kojima et al. | |
| 9,915,220 B2 | * | 3/2018 | Meirelles Tomanik | .. F02F 1/20 |
| 10,107,227 B2 | | 10/2018 | Qin | |
| 2004/0226402 A1 | * | 11/2004 | Fuchs | F16J 10/04 74/828 |
| 2017/0009888 A1 | * | 1/2017 | Pegg | F16J 1/08 |
| 2017/0167430 A1 | * | 6/2017 | Bettini Rabello | ........ F02F 1/16 |
| 2020/0256277 A1 | * | 8/2020 | Kawai | ......... F16J 9/20 |
| 2020/0398336 A1 | * | 12/2020 | Hatakeyama | ............ F16J 10/04 |
| 2021/0154793 A1 | * | 5/2021 | Höglund | ................ B24B 33/08 |

FOREIGN PATENT DOCUMENTS

| CN | 211852006 U | 11/2020 |
|---|---|---|
| KR | 20140148003 A | 12/2014 |

* cited by examiner

*Primary Examiner* — Kurt Philip Liethen

(74) *Attorney, Agent, or Firm* — Bookoff McAndrews, PLLC

(57) ABSTRACT

Systems and methods for forming a plurality of valleys on an inner circumferential surface of a cylinder liner for uniform oil film thickness are disclosed. In one aspect, an internal combustion engine includes a piston; and a cylinder liner surrounding the piston, wherein the cylinder liner has a plurality of valleys on an inner circumferential surface of the cylinder liner, and wherein the plurality of valleys are formed to a frequency of 7 to 14 valleys per millimeter (mm) having a depth of at least 1 micrometer (µm).

20 Claims, 5 Drawing Sheets

METHOD AND SYSTEM FOR A CYLINDER LINER

TECHNICAL FIELD

The present disclosure relates generally to internal combustion engine, and more particularly, to methods and systems for a cylinder liner of an internal combustion engine.

BACKGROUND

Internal combustion engines, e.g., gasoline engines, diesel engines, gaseous fuel engines, dual-fuel engines, etc., generate power by combusting fuel, thereby driving pistons to reciprocate along a linear path in a cylinder. During this reciprocal motion, the piston slides along a surface of a cylinder liner, typically formed as an insert that defines the interior of the cylinder. The cylinder thus includes a cylinder bore with the cylinder liner fitted inside, the surface of the cylinder liner being covered with an oil film layer to reduce friction between the cylinder liner and the piston during engine operation. In order to facilitate proper operation of the internal combustion engine, the cylinder liner needs to provide a low friction surface, while being able to form a seal with the piston to prevent leakage of intake air and combustion products below the piston. Over time, the surface of the cylinder liner tends to become worn (e.g., scratched or scuffed), especially when there is insufficient lubricating oil present on the liner during operation of the engine. In fact, a non-uniform oil film layer can cause the piston and/or piston ring face to come into contact with the base material of the cylinder liner, resulting in scratching and scuffing of the cylinder liner, piston, and/or piston ring face. Significant wear, in the form of scratching and scuffing for example, can lead to performance issues or even engine failure.

Cylinder liners can include surface treatments that seek to improve performance of the liner. While such treatments can be useful, some treatments cylinder liners can tend to form a non-uniform oil film layer, resulting in a higher propensity to surface scratching and scuffing which reduces the durability of the cylinder liner. Moreover, some cylinder liner surface treatments can also introduce problems. For example, removing an excessive amount of material from an interior surface of a cylinder liner can result in increased oil turbulence and/or reduce the surface area along which piston rings of the piston can slide.

A method for honing a cylinder jacket is disclosed in Chinese Patent Number 211,852,006 U to Chen et al. ("the '006 patent"). The method described in the '006 patent includes honing the inner wall of a cylinder sleeve body to form a groove count of 5 to 36 grooves per centimeter (cm) or a groove count of 0.5 to 3.6 per millimeter (mm), at 3 micrometer ($\mu m$) from the zero line. While the method described in the '006 patent may be useful in some circumstances, it may be prone to generation of a non-uniform oil film layer due to the presence of relatively few valleys, which can result in damage to the surface of the cylinder liner and piston ring.

The disclosed method and system may solve one or more of the problems set forth above and/or other problems in the art. The scope of the current disclosure, however, is defined by the attached claims, and not by the ability to solve any specific problem.

SUMMARY

In one aspect, an internal combustion engine may include a piston; and a cylinder liner surrounding the piston, wherein the cylinder liner has a plurality of valleys on an inner circumferential surface of the cylinder liner, wherein the plurality of valleys are formed to a frequency of 7 to 14 valleys per mm having a depth of at least 1 $\mu m$.

In another aspect, a cylinder liner of an internal combustion engine may include a hollow cylindrical body formed of metal or metal alloy, including an inner circumferential surface; and a plurality of valleys formed on the inner circumferential surface of the cylinder liner, wherein the plurality of valleys are formed to a frequency of 7 to 14 valleys per mm and have a depth of at least 1 $\mu m$, wherein the plurality of valleys intersect each other to form cross-hatching patterns.

In a further aspect, method of making a plurality of valleys on a cylinder liner for an internal combustion engine may include obtaining the cylinder liner having a hollow interior and an inner circumferential surface; and forming the plurality of valleys to a frequency of 7 to 14 valleys per mm and a depth of at least 1 $\mu m$ on the inner circumferential surface of the cylinder liner, wherein the plurality of valleys intersect each other to form cross-hatching patterns.

Other features and aspects of this disclosure will be apparent from the following description and the accompanying drawings.

BRIEF DESCRIPTION OF THE DRAWINGS

The accompanying drawings, which are incorporated in and constitute a part of the specification, are illustrative of one or more embodiments and, together with the description, explain the embodiments. The accompanying drawings have not necessarily been drawn to scale. Further, any values or dimensions in the accompanying drawings are for illustration purposes only and may or may not represent actual or preferred values or dimensions. Where applicable, some or all select features may not be illustrated to assist in the description and understanding of underlying features.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
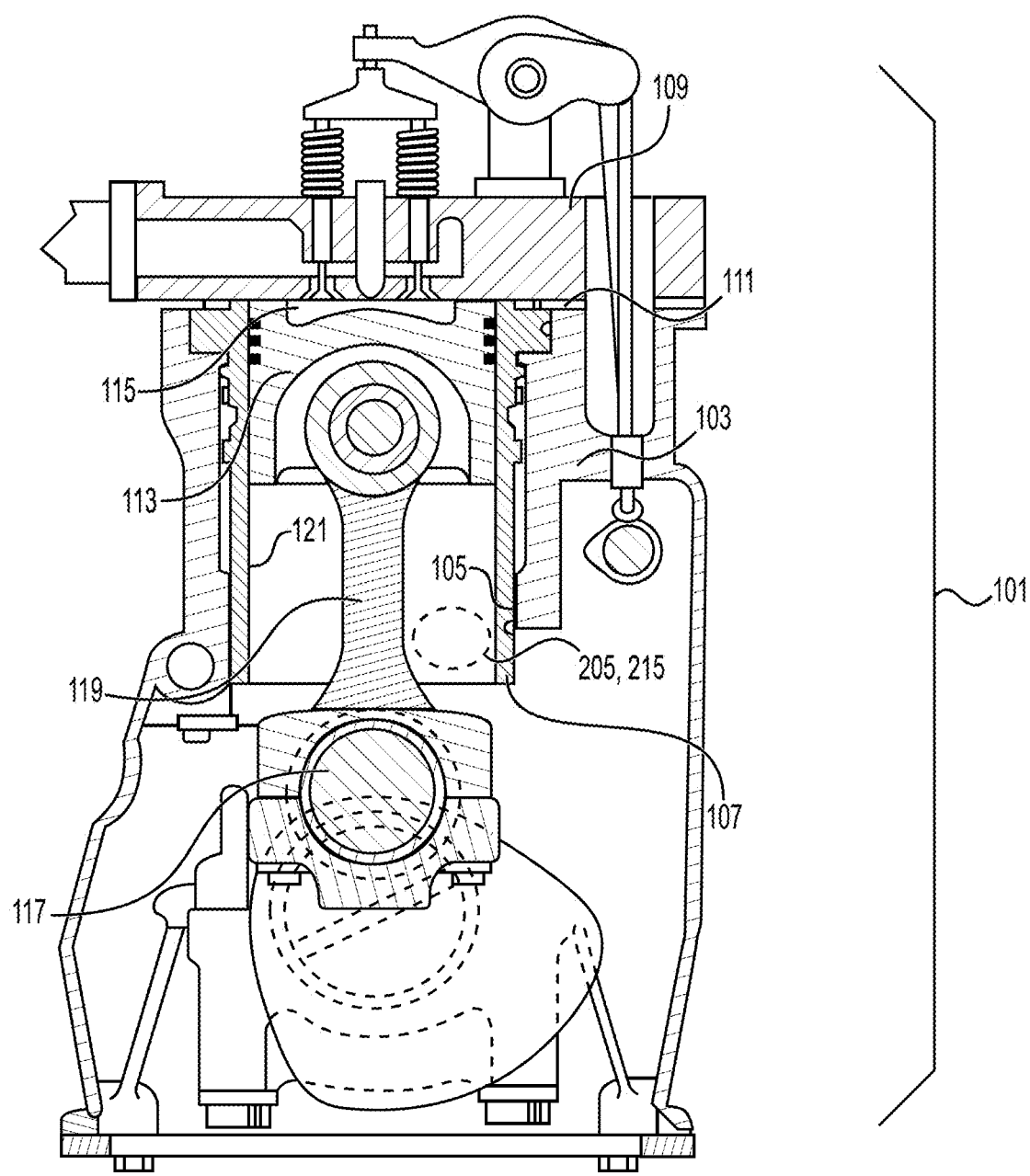
FIG. 1 is a cross-sectional view illustrating an internal combustion engine with a cylinder liner, according to aspects of the present disclosure.

FIG. 1 illustrates an internal combustion engine with a cylinder liner 107 formed with a hollow cylindrical body, according to aspects of the present disclosure. The internal combustion engine system 101 may include an engine block 103 defining plurality of cylinder bores 105. Each cylinder bore 105 may house a cylinder liner 107 that is secured in place below a cylinder head 109 and gasket 111 of engine system 101. A piston 113 may be slidably disposed within cylinder liner 107 and cylinder bore 105; and engine block 103 together with cylinder liner 107 and cylinder head 109 may define a combustion chamber 115. In one embodiment, cylinder liner 107 contacts and guides piston 113. Piston 113 may be pivotally connected to a crankshaft 117 by way of a connecting rod 119, so that a sliding motion of a plurality of pistons 113 (one shown in FIG. 1) within respective cylinder liners 107 results in a rotation of crankshaft 117 to generate power.

In one aspect, an inner circumferential surface 121 of cylinder liner 107 surrounds and contacts piston 113. To prevent abrasion of inner circumferential surface 121 of cylinder liner 107 due to sliding friction with piston 113, inner circumferential surface 121 is formed with a plurality of grooves or valleys, as described below. The number of these valleys, referred to herein as valley count ("VC"), may be within a range of 7 valleys per mm to 14 valleys per mm. As used herein, a "valley" refers to a depression (e.g., a groove or recess) that has a depth of at least about 1 μm as measured radially outwardly from the surface of the cylinder liner 107. A line formed by the surface 121 of liner 107 that does not include a valley is referred to herein as a "zero mean line." This zero mean line may represent a profile of surface 121 that is free of valleys, and also free of bumps or protrusions. Thus, each valley may have a depth of at least about 1 μm below a zero mean line defined by liner 107. The valleys may be formed alone a suitable length of liner 107, such as a "running surface" of liner 107 that extends across every portion of liner 107 along which piston 113 "runs" or slides during operation of engine system 101.

Figure 2C:
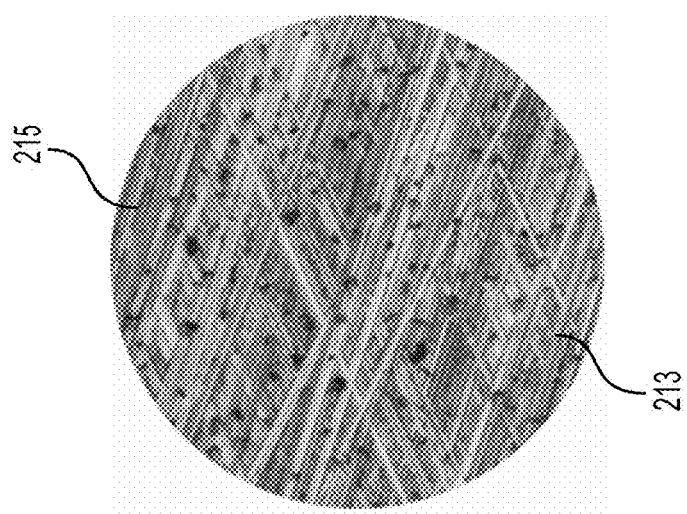
FIGS. 2B-2C are images showing inner circumferential cylinder liner surfaces with different valley counts, according to aspects of the present disclosure.
Figure 2B:
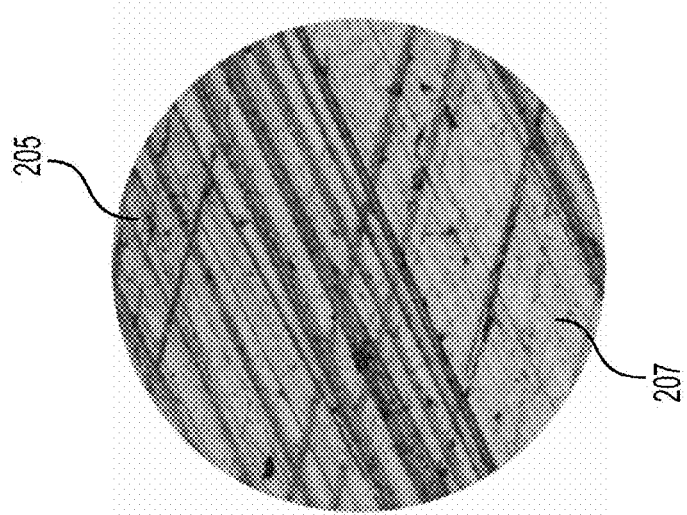
Figure 2A:
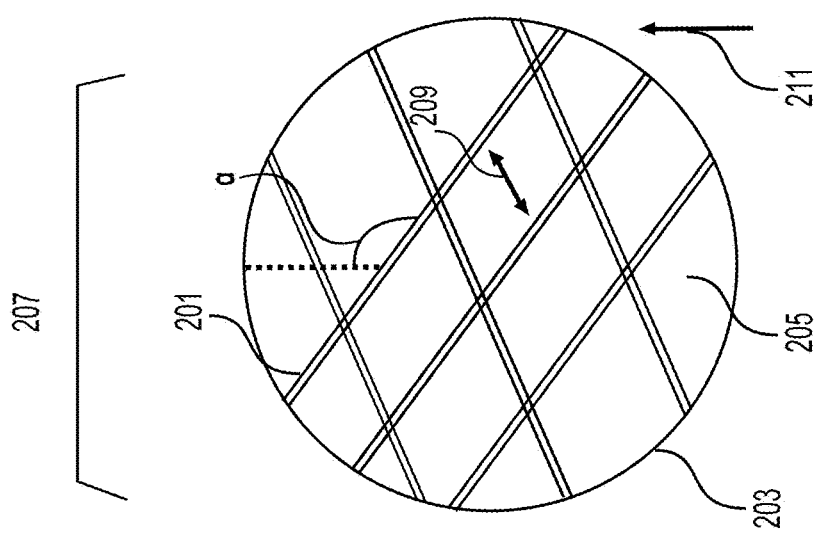
FIG. 2A is a line diagram of an inner circumferential surface of a cylinder liner, according to aspects of the present disclosure.

FIG. 2A corresponds to FIG. 2B and shows valleys 201 that intersect each other to form cross-hatching pattern 203 on inner circumferential surface 205 of cylinder liner 207. In one aspect, valleys 201 are formed at an angle α of between 120 degrees and 160 degrees with respect to an axial line of cylinder liner 207, shown as a dashed line in FIG. 2A. In particular, valleys 201 may be formed at an angle α of about 140 degrees. In one aspect, a distance 209 between adjacent valleys 201 may be approximately consistent and uniform. In one aspect, valleys 201 may have a length equal to the length of inner circumferential surface 205, e.g., valleys 201 may extend across an entire axial length of cylinder liner 207. The density of cross-hatching pattern 203 may be equal to the total area of the inner circumferential surface 205, e.g., the area containing valleys 201 may be equal to the entire inner circumferential surface 205. In one aspect, valleys 201 may run across the inner circumferential surface 205 in a helical trajectory defined by the speed, e.g., rotational speed and stroke speed, of a honing machine used to form valleys 201. In one aspect, valleys 201 are inclined with respect to the linear motion direction 211 of piston 113.

FIG. 2C is an image showing an exemplary cylinder liner 213 (which, like cylinder liner 207 in FIG. 2B, may correspond to above-described cylinder liner 107) that has a different valley count on inner circumferential surface 215, according to aspects of the present disclosure. As can be seen in FIGS. 2B and 2C, the valleys formed in cylinder liners 207 and 213 may be formed in a cross-hatching pattern on inner circumferential surfaces 205 and 215. In FIG. 2B, inner circumferential surface 205 of cylinder liner 207 may have, e.g., a VC of 9.0 per mm with valleys having a depth of about 1 μm to about 5 μm below a zero mean line. Cylinder liner 207 may have a lower propensity to surface scratching and scuffing, for example as the reduced distance between valleys is configured to hold oil for a longer period of time, thereby preventing abrasion of the inner surface of cylinder liner 207 due to sliding friction between liner 207 and a piston. Referring to FIG. 2C, inner circumferential surface 215 of cylinder liner 213 may, in at least some embodiments, have a further reduced propensity to surface scratching and scuffing due to the higher count of the valleys, e.g., a VC of 14.0 per mm of valleys having a depth of 1 μm to 5 μm below a zero mean line. In some configurations, cylinder liner 207 may have valleys with a depth of about 1 μm to about 8 μm below a zero mean line. In some aspects, consistent and uniform valley spacing and valley count throughout the running surface of cylinder liner 207 and 213 may result in a uniform oil retention volume and film thickness that may ensure a consistent hydrodynamic pressure between the piston ring and cylinder liner wall.

Figure 3:
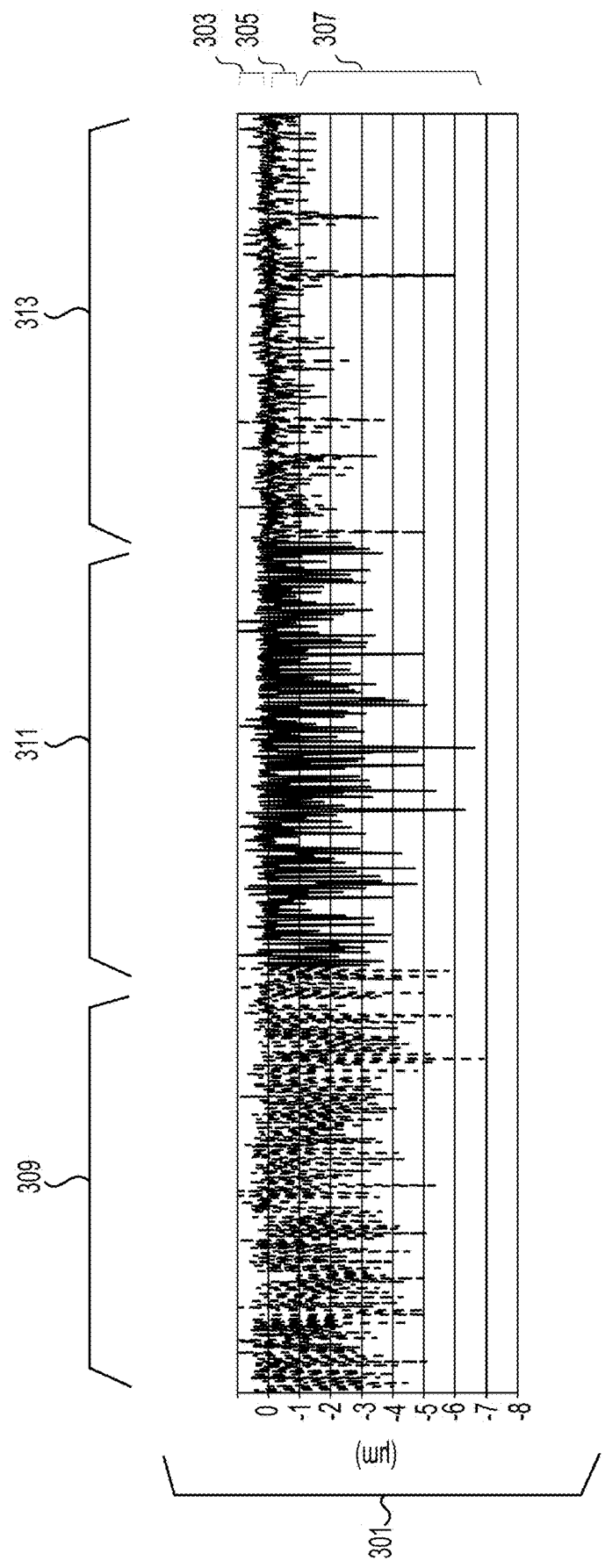
FIG. 3 is a graph that depicts a tactile measurement of valley count via a profilometer, according to aspects of the present disclosure

FIG. 3 is a graph that depicts a measurement of the above-described cylinder liner inner circumferential surfaces performed with a profilometer, according to aspects of the present disclosure. The profilometer measurements illustrated in FIG. 3 correspond to the profile of surface 121 of cylinder liner 107 indicating valleys with a depth of 1 μm to 5 μm below the zero mean line. In one aspect, a profilometer (not shown) may be placed on the surface of a honed cylinder liner, e.g., cylinder liner 107, and a stylus of the profilometer may measure reduced peak height (Rpk), core roughness depth (Rk), reduced valley depth (Rvk), and the number of valleys present in a crosshatch pattern from the zero mean line. In one aspect, graph 301 comprises regions 303, 305, and 307:

(i) Region 303 shows RpK, and represents peaks protruding from the zero mean line;
(ii) Region 305 shows Rk, and represents the portion of surface 205, 215 that will support the majority of the load; and
(iii) Region 307 shows Rvk, and represents oil retaining valleys formed in the cylinder liner.

Graph 301 also comprises regions 309, 311, and 313 that illustrate different RpK, Rk, and Rvk values for exemplary cylinder liners with differing VC values. Region 309 may correspond to a cylinder liner having a VC of 13.9 per mm, including valleys having a depth of about 1 μm to about 5 Region 311 represents a cylinder liner having a somewhat lower VC of 11.7 per mm for valleys having a depth of about 1 μm to about 5 Region 313 may represent a cylinder liner having a further reduced VC of 7.8 per mm for valleys having a depth of about 1 μm to about 8 The depth and frequency of the peaks and valleys affect oil consumption, cylinder wall lubrication, piston ring rotation, and piston ring break-in. The surface protruding peaks may be worn down during engine operation so as to create a plateau for the piston ring to seal against, while the valleys will hold the oil that is used to coat the surface of the cylinder liner to prevent direct contact with the piston ring.

INDUSTRIAL APPLICABILITY

The present disclosure is applicable to cylinder liners in general and to reciprocating piston engines or reciprocating piston compressors having permanent or removable cylinder liners, or any other machine having a cylinder liner installed in a block. The reciprocating piston engines useful with cylinder liners according to the present disclosure may be useful for electrical power generation, machine operation, locomotion, etc. The disclosed cylinder liner may be used in any application where it is desired to increase the reliability and operating life of the associated engine.

During the operation of internal combustion engine system 101, piston 113 moves along inner circumferential surface 121 of cylinder liner 107 and contacts cylinder liner 107 while sliding at high speed. To prevent abrasion of inner circumferential surface 121 of cylinder liner 107 due to sliding friction, a film of engine oil is formed on inner circumferential surface 121 for facilitating smooth sliding contact between piston 113 and cylinder liner 107. The presence of a plurality of valleys formed at an average frequency or VC of 7 to 14 valleys per mm on inner circumferential surface 121 may facilitate the ability of liner 107 to retain oil and maintain uniform oil film thickness throughout the cylinder liner 107, thereby preventing cylinder liner 107 from scratching and scuffing.

Figure 4:
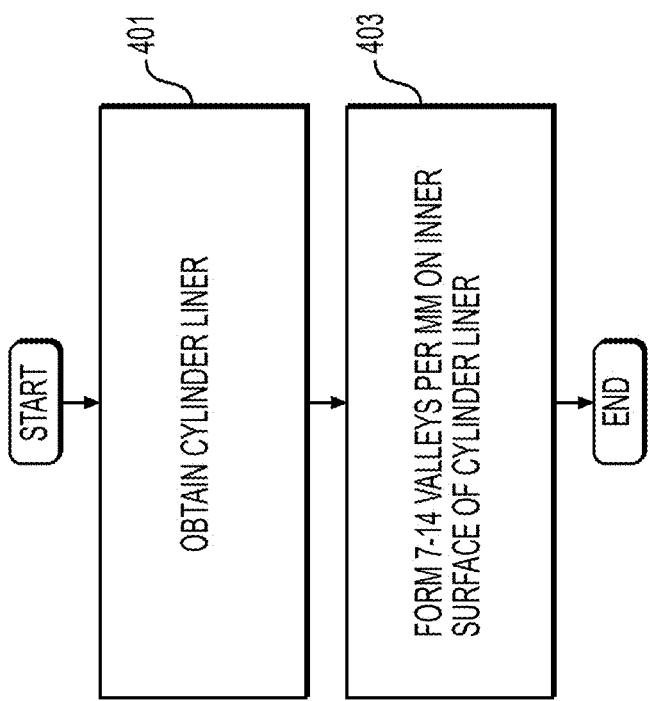
FIG. 4 is a flowchart of a process for making a plurality of valleys on an inner circumferential surface of the cylinder liner of an internal combustion engine, according to aspects of the present disclosure.

FIG. 4 is a flowchart of a process for making a plurality of valleys on an inner circumferential surface of a cylinder liner of an internal combustion engine, according to aspects of the present disclosure. While certain operations are described as being performed by certain components, it should be understood that such operations may be performed by different components and/or different combinations of components. Further, it should be understood that one or more of the operations below may be performed concurrently and/or in an order different than the order presented below. Additionally, in various embodiments, one or more of the following operations may be omitted, and/or additional operations may be added.

At step 401, a cylinder liner 107 may be obtained, cylinder liner 107 having an inner circumferential surface 121 formed of a metal or metal alloy, such as cast iron or steel suitable for honing, and a hollow interior. Cylinder liner 107 may be manufactured any suitable method (e.g., by casting), and may be suitable for use in an engine (e.g., a diesel engine, a gasoline engine, a gaseous fuel engine, a dual fuel engine, etc.). In one aspect, cylinder liner 107 is a centrifugal cast cylinder liner.

At step 403, a pre-machining process is performed on inner circumferential surface 121 to remove casting residues, if any. If desired, inner circumferential surface 121 may be roughly honed, a process that forms a substantially uniform surface free of valleys. Then cylinder liner 107 may be processed, e.g., by finely honing the inner circumferential surface of the cylinder liner with a honing device comprising a plurality of honing stones or by irradiating the inner circumferential surface with a laser, to form valleys for adhesion of oil. In one aspect, the plurality of valleys is formed with a frequency of 7 to 14 valleys per mm. The valleys may have a depth of at about 1 μm to about 5 μm as measured with respect to a zero mean line. In one aspect, honing the inner circumferential surface of cylinder liner 107 may involve scraping an abrasive stone against inner circumferential surface 121 of cylinder liner 107 with a honing device. A desired surface finish may be achieved with honing according to the proper grade of abrasive stones and the speed (e.g., rotational speed) applied to the abrasive stones during the honing process. In one aspect, inner circumferential surface 121 may be honed at a speed of approximately 90 RPM for approximately 1 to 3 minutes to form valleys at a frequency of 7 to 14 valleys per mm having a minimum depth of 1 μm below a zero mean line.

As described above, the plurality of valleys may form a cross-hatched pattern and may be inclined with respect to an axial direction of cylinder liner 107 (e.g., a direction parallel to a direction along which piston 113 translates during operation of engine system 101). The plurality of valleys may intersect with each other (e.g., when moving along this longitudinal direction) to retain an oil film. The plurality of valleys may have a substantially uniform structure and consistent spacing throughout the cylinder liner. In one aspect, the plurality of valleys may be formed on inner circumferential surface 121 of cylinder liner 107 by a honing device, as described above, such that the plurality of valleys are V-shaped, with the maximum depth of the valley forming the bottom of the "V". The valleys may form an angle with respect to the longitudinal direction or axis of cylinder liner 107, such as an angle α of about 120 degrees to about 160 degrees. In one aspect, the plurality of valleys may have a width of 12 μm to 20 μm, and a depth of 1 μm to 5 μm.

A valley count of 7 to 14 valleys per mm on inner circumferential surface 121 of cylinder liner 107 may retain an oil film and result in a uniform volume and thickness of the oil film throughout the cylinder liner. Such uniformity in volume and thickness of an oil film may ensure a consistent hydrodynamic pressure between the piston ring and cylinder liner, and prevent scratching of cylinder liner 107 and scuffing of the running surface of liner 107.

Figure 5:
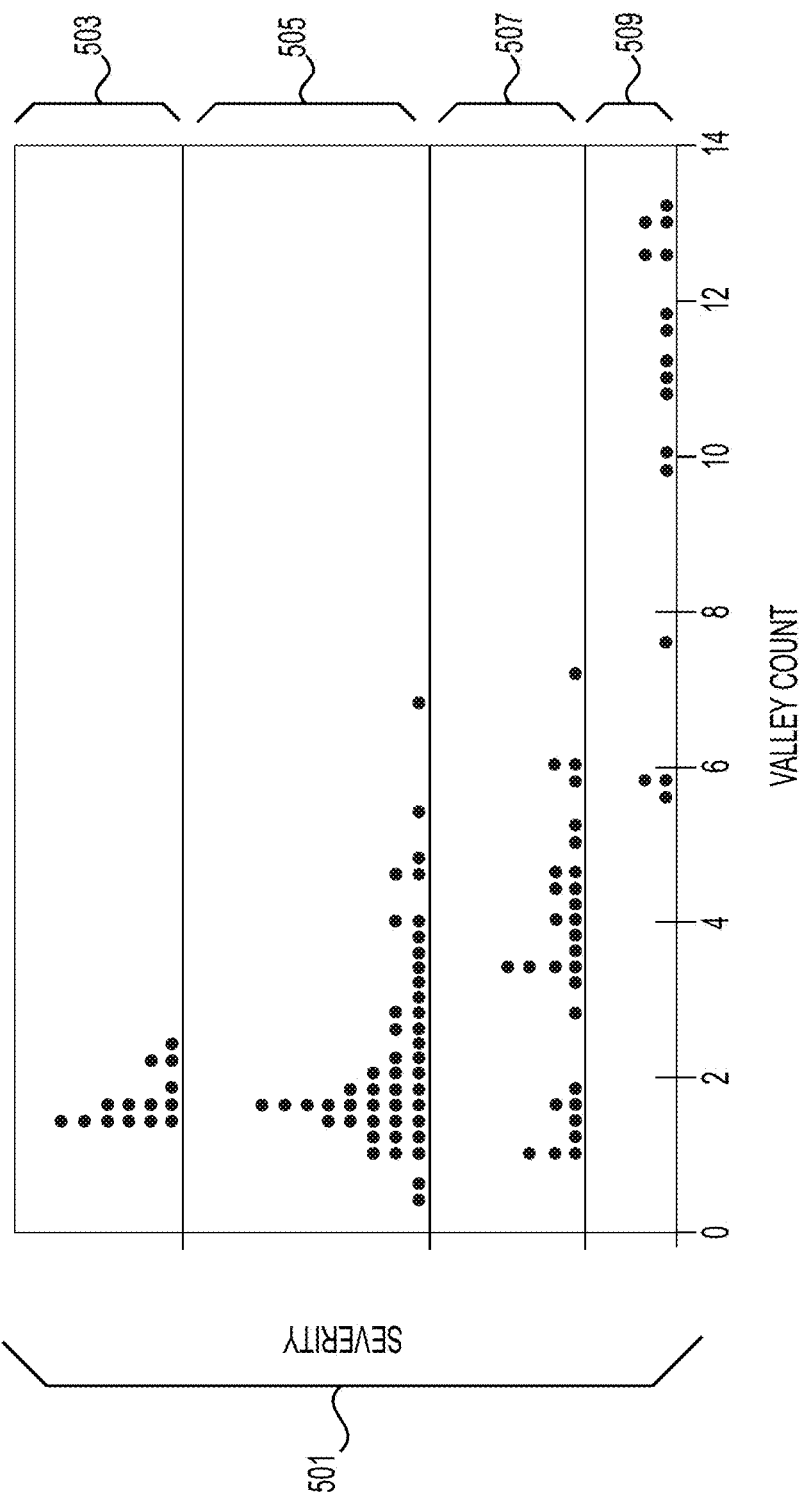
FIG. 5 is a histogram illustrating frequency and relative severity of damage to the cylinder liner as a function of valley count per mm, according to aspects of the present disclosure.

FIG. 5 is a histogram illustrating frequency and relative severity of damage of cylinder liner 107 as a function of valley count (or VC) per mm, according to aspects of the present disclosure. In this example embodiment, graph 501 shows that the severity of damage to cylinder liner 107 may decrease with a VC of 7 valleys per mm to 14 valleys per mm on surface 121 of cylinder liner 107. As depicted, graph 501 includes:
  (i) Region 503: occurrences of high adhesive wear to inner circumferential surface 121;
  (ii) Region 505: occurrences of moderate bore stripping of inner circumferential surface 121;
  (iii) Region 507: occurrences of light fine scratching of inner circumferential surface 121; and
  (iv) Region 509: represents cylinder liners in which no damage was present in inner circumferential surface 121.

As shown in FIG. 5, the severity of damage to the inner surface of the cylinder liner trends to increase with a corresponding decrease in the number of valleys, e.g., <7 valleys per mm, for valleys having a depth of at least 1 μm. Valley counts below 7 valleys per mm may, for example, result in wider gaps between the valleys, such that cylinder liner 107 is subjected to higher adhesive wear, bore stripping, and/or fine scratching. Thus, cylinder liners 107 having a valley count of <7 valleys per mm at 1 μm below the zero mean line may have an increased probability of experiencing cylinder liner running surface damage as well as reduced durability of piston ring face coating because gaps between the valleys create a plateau feature that does not retain or generate a required oil film.

On the other hand, the severity of damage to cylinder liner 107 may drop substantially by forming a valley count of 7 to 14 valleys per mm in the manner described above. This valley count range may, in at least some embodiments, reduce friction between cylinder liner 107 and the piston 113, such that cylinder liner 107 may incur no damage during engine operation. In one aspect, the valleys may act as an oil reservoir, and provide residual lubrication and a localized supply of oil. For example, as the frequency of the valleys was increased to 7 to 14 per mm at 1 µm below a zero mean line, the ability to store lubricating oil on the inner surface of the cylinder liner was enhanced. While a valley count of 7 valleys or more per mm may be beneficial, a valley count in excess of 14 valleys per mm may tend to result in overlapping valleys and/or increased turbulence of retained oil.

One or more embodiments of this disclosure may increase the resistance of a cylinder liner 107 to damage, such as scratching and scuffing that tends to accrue during engine operation, by providing 7 to 14 valleys per mm, each of the valleys having a depth of at least 1 µm. The presence of 7 to 14 valleys per mm may result in a uniform oil film thickness for a continuous oil supply to maintain the hydrodynamic pressure of the oil. The valleys may have a consistent and uniform spacing throughout cylinder liner 107 to facilitate uniform oil thickness. A cylinder liner 107 with 7-14 valleys per mm may result in consistent performance and durability of the engine while also achieving reduced oil consumption. Cylinder liner 107 may also tend to prevent engine blow-by when the cylinder liner 107 and piston 113 cannot form a proper seal, thus avoiding emission problems in the internal combustion engine system 101.

It will be apparent to those skilled in the art that various modifications and variations can be made to the disclosed method and system without departing from the scope of the disclosure. Other embodiments of the method and system will be apparent to those skilled in the art from consideration of the specification and practice of the apparatus and system disclosed herein. It is intended that the specification and examples be considered as exemplary only, with a true scope of the disclosure being indicated by the following claims and their equivalents.

What is claimed is:

1. An internal combustion engine, comprising:
    a piston pivotally connected to a crankshaft by a connecting rod; and
    a cylinder liner surrounding the piston and a portion of the connecting rod, wherein the cylinder liner has a plurality of valleys on an inner circumferential surface of the cylinder liner,
    wherein the plurality of valleys have a helical trajectory and are formed to a frequency of 7 to 14 valleys per millimeter (mm) having a depth of at least 1 micrometer (µm), and wherein the plurality of valleys have a length that is equal to a length of the inner circumferential surface of the cylinder liner and are inclined towards a linear motion direction of the piston.

2. The internal combustion engine according to claim 1, wherein the plurality of valleys intersect each other to form cross-hatching patterns, and wherein parallel valleys of the plurality of valleys are uniformly spaced apart.

3. The internal combustion engine according to claim 1, wherein the plurality of valleys are V-shaped.

4. The internal combustion engine according to claim 1, wherein the plurality of valleys have the depth of about 1 µm to about 5 µm.

5. The internal combustion engine according to claim 1, wherein the plurality of valleys are arranged at an angle of 120 degrees to 160 degrees to an axis of the cylinder liner.

6. The internal combustion engine according to claim 1, wherein the cylinder liner is formed of cast iron or steel.

7. The internal combustion engine according to claim 1, wherein the cylinder liner is a centrifugal cast cylinder liner.

8. A cylinder liner of an internal combustion engine, comprising:
    a hollow cylindrical body formed of metal or metal alloy, including an inner circumferential surface that surrounds a piston and a portion of a connecting rod that pivotally connects the piston to a crankshaft; and
    a plurality of valleys with a helical trajectory formed on the inner circumferential surface of the cylinder liner, wherein the plurality of valleys are formed to a frequency of 7 to 14 valleys per millimeter (mm) and have a depth of at least 1 micrometer (µm),
    wherein the plurality of valleys intersect each other to form cross-hatching patterns, and wherein the plurality of valleys have a length that is equal to a length of the inner circumferential surface of the cylinder liner and are inclined towards a linear motion direction of the piston.

9. The cylinder liner according to claim 8, wherein the cylinder liner is a centrifugal cast cylinder liner.

10. The cylinder liner according to claim 8, wherein the plurality of valleys are V-shaped.

11. The internal combustion engine according to claim 1, wherein the plurality of valleys have the depth of about 1 µm to about 5 µm.

12. The cylinder liner according to claim 8, wherein the plurality of valleys are arranged at an angle of 120 degrees to 160 degrees to an axis of the cylinder liner.

13. The cylinder liner according to claim 8, wherein the cylinder liner and the plurality of valleys are formed of cast iron or steel.

14. The cylinder liner according to claim 8, wherein the inner circumferential surface of the cylinder liner are honed by a honing device with abrasive stones to from the plurality of valleys.

15. A method of making a plurality of valleys on a cylinder liner for an internal combustion engine, the method comprising:
    obtaining the cylinder liner having a hollow interior and an inner circumferential surface; and
    forming the plurality of valleys to a frequency of 7 to 14 valleys per millimeter (mm) and a depth of at least 1 micrometer (µm) on the inner circumferential surface of the cylinder liner,
    wherein the plurality of valleys intersect each other to form cross-hatching patterns, and wherein the plurality of valleys have a length that is equal to a length of the inner circumferential surface of the cylinder liner and are inclined towards a linear motion direction of the piston.

16. The method according to claim 15, further comprising:
    honing the inner circumferential surface of the cylinder liner with a honing device at a rotational speed of approximately 90 RPM for approximately 1 to 3 minutes to form the plurality of valleys.

17. The method according to claim 15, further comprising:
    forming the plurality of valleys to have a V-shape.

18. The method according to claim 15, further comprising:
    forming the plurality of valleys to a width of 12 µm to 20 µm.

19. The method according to claim 15, further comprising:
    forming the plurality of valleys at an angle of 120 degrees to 160 degrees to an axis of the cylinder liner.

20. The method according to claim 15, wherein the cylinder liner is formed of a cast iron or steel.

* * * * *